(12) United States Patent
Sasaki

(10) Patent No.: US 9,869,383 B2
(45) Date of Patent: Jan. 16, 2018

(54) REDUCTION GEAR

(71) Applicant: NIPPON THOMPSON CO., LTD., Tokyo (JP)

(72) Inventor: Satoshi Sasaki, Mino (JP)

(73) Assignee: NIPPON THOMPSON CO., LTD., Tokyo (JP)

( * ) Notice: Subject to any disclaimer, the term of this patent is extended or adjusted under 35 U.S.C. 154(b) by 0 days.

(21) Appl. No.: 15/241,266

(22) Filed: Aug. 19, 2016

(65) Prior Publication Data
US 2017/0059029 A1    Mar. 2, 2017

(30) Foreign Application Priority Data
Sep. 2, 2015    (JP) .................................. 2015-172776

(51) Int. Cl.
| | | |
|---|---|---|
| *F16H 57/04* | (2010.01) | |
| *B60K 17/04* | (2006.01) | |
| *B60K 7/00* | (2006.01) | |
| *F16H 1/32* | (2006.01) | |

(52) U.S. Cl.
CPC ....... *F16H 57/0406* (2013.01); *B60K 7/0007* (2013.01); *B60K 17/046* (2013.01); *F16H 57/0486* (2013.01); *B60Y 2306/03* (2013.01); *F16H 1/32* (2013.01); *F16H 2001/325* (2013.01)

(58) Field of Classification Search
None
See application file for complete search history.

(56) References Cited

U.S. PATENT DOCUMENTS 1,770,035 A * 7/1930 Heap .................. F16H 1/32
475/159

FOREIGN PATENT DOCUMENTS

| JP | 2004211847 A | 7/2004 |
|---|---|---|
| JP | 2008309264 A | 12/2008 |

* cited by examiner

*Primary Examiner* — Dirk Wright
(74) *Attorney, Agent, or Firm* — Browdy and Neimark, PLLC

(57) ABSTRACT

A reduction gear of the present invention is compact and light and can be used for tire portions of an apparatus for travelling, etc. Each of outer and inner pins is formed by a rolling bearing. The reduction gear includes block-shaped lubricating members which supply a lubricant to the outer rings of the outer pins to thereby lubricate them, and a ring-shaped lubricating member which supplies the lubricant to the outer rings of the inner pins to thereby lubricate them. The lubricant can be supplied to a pair of cycloid gears through the outer pins and the inner pins for lubrication. Since the cycloid gears, the outer pins, and the inner pins are lubricated by the lubricating members, the reduction gear can enhance its durability, reduce the friction between components to thereby lower the frictional resistance, and realize a light and compact structure.

13 Claims, 7 Drawing Sheets

REDUCTION GEAR

FIELD OF THE INVENTION

The present invention relates a compact, light weight reduction gear which can be used for various types of apparatuses such as tire portions of apparatuses for travelling, robots, machine tools, etc.

BACKGROUND OF THE INVENTION

Japanese Patent Application Laid-Open No. 2004-211847 discloses a conventional power transmission apparatus applied to, for example, a conveyer or a garbage disposal. The power transmission apparatus can properly control an increase in its transmission capacity and reduction of its noise or vibration in accordance with a load exerted by a driven device, while reducing its size and saving space. The power transmission apparatus can transfer an input power to the driven device, and its power transmission mechanism is composed of a first inscribed meshing planetary gear mechanism and a second inscribed meshing planetary gear mechanism disposed in parallel on a power transmission path between an input shaft and an output shaft. The first inscribed meshing planetary gear mechanism includes a first external gear and a first internal gear which slightly differ in the number of teeth, the first external gear being disposed inside the first internal gear such that the first external gear can rotate eccentrically while maintaining the inscribed meshing. The second inscribed meshing planetary gear mechanism includes a second external gear and a second internal gear which slightly differ in the number of teeth, the second external gear being disposed inside the second internal gear such that the second external gear can rotate eccentrically while maintaining the inscribed meshing. The difference in the number of teeth between the first external gear and the first internal gear is rendered different from the difference in the number of teeth between the second external gear and the second internal gear, whereby the power transmitting characteristic of the first inscribed meshing gear mechanism is rendered different from that of the second inscribed meshing planetary gear mechanism.

A cycloid reduction gear built in an in-wheel motor drive device is disclosed in, for example, the Japanese Patent Application Laid-Open No. 2008-309264. The disclosed cycloid reduction gear includes a casing, an input shaft having an eccentric portion, a revolving member which has a through hole into which the eccentric portion is inserted and which revolves about its rotation axis as a result of rotation of the input shaft, an outer periphery engagement member which is held by the casing and which engages with an outer peripheral portion of the revolving member so as to cause rotation of the revolving member about its axis, and a motion conversion mechanism which includes internal pins provided on an output shaft, holes formed in the revolving member, having a diameter larger than the outer diameter of the internal pins by a predetermined amount, and receiving the internal pins, and cylindrical members fitted onto the internal pins at a position where the cylindrical members come into contact with the inner wall surfaces of the holes. The motion conversion mechanism converts rotational motion of the revolving member about its axis to rotational motion around the rotation axis of the input shaft and transmits the rotational motion to the output shaft. Each cylindrical member is fitted onto an internal pin corresponding thereto with a predetermined radial gap formed therebetween. Dynamic pressure grooves are formed in either of the outer surface of the internal pin and the inner surface of the cylindrical member, whereby a dynamic pressure bearing is constituted.

Incidentally, in the conventional power transmission apparatus, the power transmitting characteristics of the first and second gear mechanisms provided in parallel are rendered different from each other by providing a difference between the difference in the number of teeth between the external gear and the internal gear of the first gear mechanism and the difference in the number of teeth between the external gear and the internal gear of the second gear mechanism. Therefore, the conventional power transmission apparatus is large in size, and rendering the conventional power transmission apparatus light and compact has been difficult.

SUMMARY OF THE INVENTION

An object of the present invention is to solve the problem mentioned above and provide a compact, light weight reduction gear which can be used for various types of apparatuses such as tire portions of apparatuses for travelling, robots, machine tools, etc. and in which outer pins and inner pins located between relatively moving members are formed of rolling bearings, and a plurality of lubricating members are built in to come into contact with the outer rings of the rolling bearings, so as to supply a lubricant from the lubricating members to the outer rings of the outer and inner pins and lubricate the outer rings and supply the lubricant to a pair of cycloid gears directly from the outer pins or through the outer pins and the inner pins and lubricate the cycloid gears, to thereby improve transmission efficiency.

Subject to be Solved with the Present Invention

The present invention provides a reduction gear comprising: an input shaft having a pair of eccentric portions which are located adjacent each other in an axial direction of the input shaft and which have a phase difference of 180° therebetween in a circumferential direction of the input shaft; a pair of cycloid gears which rotate in contact with outer circumferences of the eccentric portions; a hub which is located adjacent to the cycloid gears, rotatably supports the input shaft, and serves as an output shaft; an output shaft pin holder which is fixed to the hub, with the cycloid gears intervening between the output shaft pin holder and the hub, and which rotatably supports the input shaft; a plurality of outer pins which roll on peripheral tooth surfaces of tooth portions of the cycloid gears; an outer pin holder which holds the outer pins such that the outer pins are spaced from one another in the circumferential direction and which rotatably supports the hub and the output shaft pin holder; a plurality of inner pins which roll on wall surfaces of a plurality of insertion holes formed in the cycloid gears and which are supported by the hub; and a plurality of lubricating members which are in contact with the outer pins and the inner pins and lubricate the outer pins and the inner pins.

The hub is rotatably supported by the outer pin holder through a cross roller bearing. Each of the outer pins and the inner pins is a rolling bearing which is composed of a shaft, a pair of outer rings rotatably disposed on the shaft, and a plurality of rollers rolling between the outer rings and the shaft; and side plates are disposed at axially opposite ends shafts of the outer pins and the inner pins.

In this reduction gear, a gear separator ring is disposed between the cycloid gears, and thrust washers are built in to be located on opposite sides of the cycloid gears where the cycloid gears are in sliding contact with other members.

The shafts of the outer pins are attached between the outer pin holder and an outer pin holder plate which is disposed around the output shaft pin holder and faces the outer pin holder, with the cycloid gears intervening between the outer pin holder plate and the outer pin holder. The shafts of the inner pins are attached between the hub and the output shaft pin holder which is disposed to face the hub with the cycloid gears intervening between the output shaft pin holder and the hub.

The lubricating members includes a block-shaped lubricating member which is elastically deformably fitted into and supported by a recess formed in the outer pin holder supporting the outer pins and which is in contact with the outer rings of the outer pins and lubricates the outer rings of the outer pins. The block-shaped lubricating member includes a lubricant supply portion composed of an inner circumferential surface of the lubricating member and opposite end surfaces of the lubricating member which are formed at opposite ends of the inner circumferential surface in the circumferential direction, the inner circumferential surface being in contact with the peripheral tooth surfaces of the tooth portions of the cycloid gears so as to lubricate the peripheral tooth surfaces, and the opposite end surfaces being in contact with the outer rings of the outer pins located adjacent to the block-shaped lubricating member so as to lubricate the outer rings of the outer pins.

The lubricating members includes a ring-shaped lubricating member which is fitted to and supported by an inner circumferential surface of a gear separator ring disposed between the cycloid gears and lubricates the inner pins. The ring-shaped lubricating member has a lubricant supply portion which is formed over the entirety of an inner circumferential surface of the ring-shaped lubricating member and is in contact with the outer rings of the inner pins so as to lubricate the outer rings of the inner pins. Each of the lubricating members is a porous molded member impregnated with a lubricant.

The outer pin holder has a plurality of T-slot-shaped cutouts spaced from one another in the circumferential direction, and head portions of bolts for fixing a motor attached to the reduction gear are disposed in the cutouts. An output shaft of a motor driving the input shaft is connected to the input shaft, and a wheel including a tire is attached to the hub.

Effect of the Invention

As described above, in the cycloid reduction gear of the present invention, each of the outer pins and the inner pins is formed by a rolling bearing, and a plurality of lubricating members which come into contact with the outer rings of the outer pins and the inner pins are provided. Thus, the lubricant is supplied from the lubricating members to the outer pins, the inner pins, and the cycloid gears so as to lubricate these members. Further, the lubricant is supplied to the cycloid gears directly from the outer pins and through the outer pins and the inner pins. Therefore, it is possible to enhance the durabilities of the cycloid gears, the outer pins, and the inner pin. In addition, since the frictional resistance can be lowered by reducing the friction between components, the transmission efficiency can be improved. Furthermore, a light and compact structure can be realized.

DETAILED DESCRIPTION OF THE EMBODIMENT

The reduction gear according to the present invention is compact and light weight and is therefore suitably built into power transmission paths of various types of apparatuses such as tire portions of apparatuses for travelling, robots, machine tools, etc. An embodiment of the reduction gear according to the present invention will be described with reference to the drawings. This compact, light weight reduction gear includes lubricating members 9 and 10 which are provided for sliding portions and are formed of a porous molded member impregnated with a lubricant. This reduction gear transmits drive power from an input shaft 1 attached to drive means such as a motor to a hub 2 (output shaft) while reducing rotational speed through a pair of cycloid gears 11 and 12.

Figure 5:
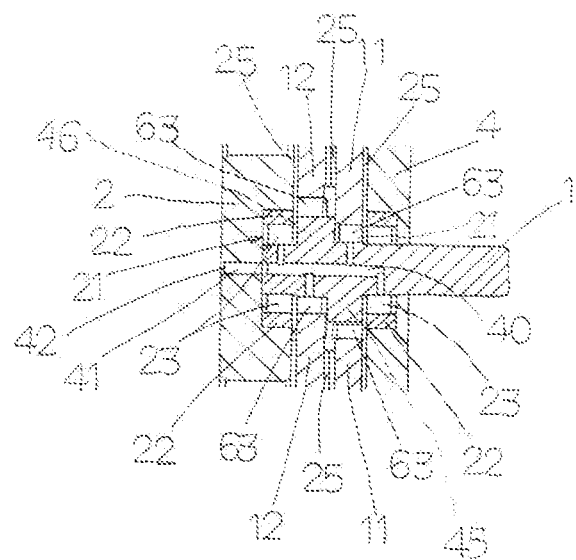
FIG. 5 is a partial sectional view of the reduction gear taken along line V-V in FIG. 1.
Figure 6:
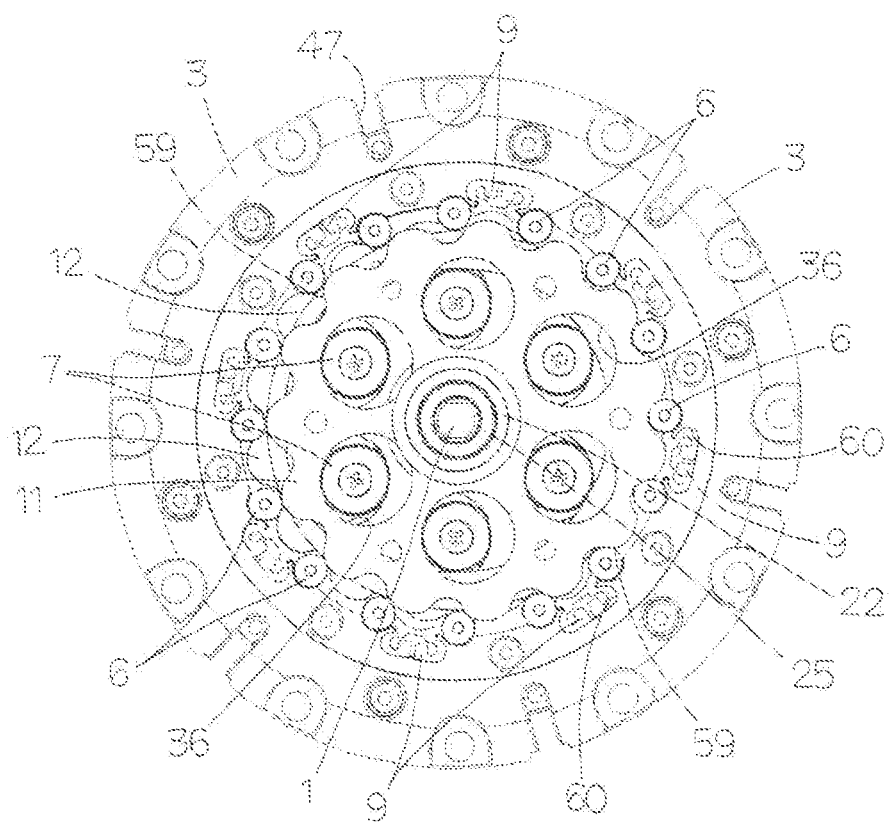
FIG. 6 is a front view of the reduction gear of FIG. 1 in a state in which an outer pin holder plate, an output shaft pin holder, and thrust washers are removed from the reduction gear so as to show cycloid gears and a plurality of block-shaped lubricating members.
Figure 7:
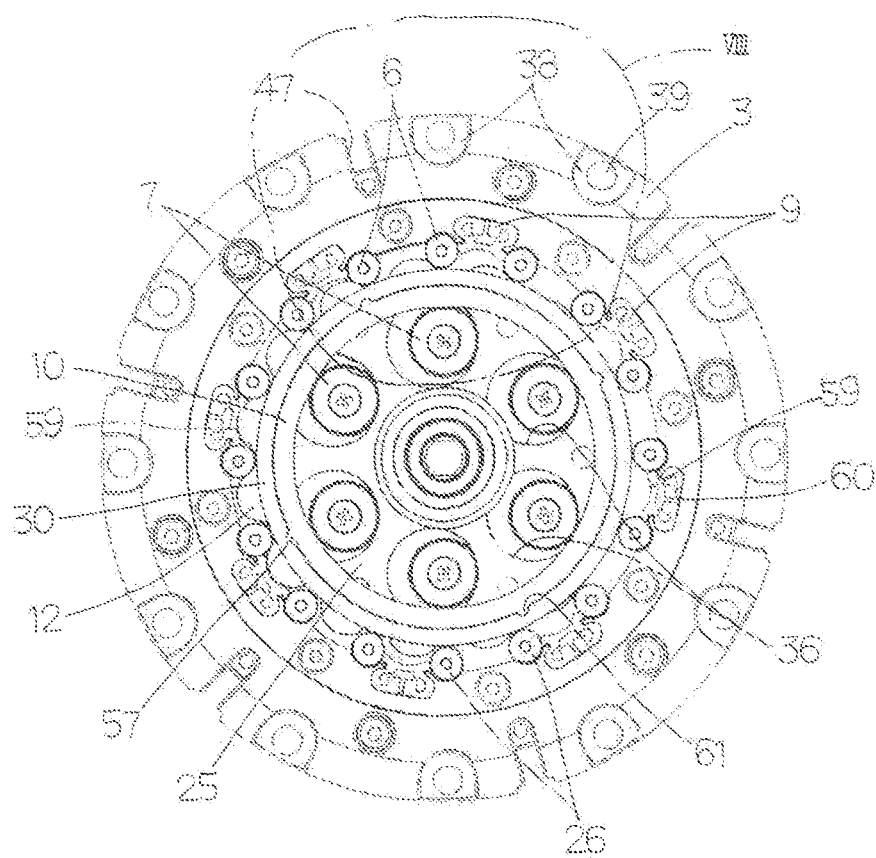
FIG. 7 is a front view of the reduction gear shown in FIG. 6 in a state in which the near-side cycloid gear is removed from the reduction gear so as to show the block-shaped lubricating members and a ring-shaped lubricating member.
Figure 8:
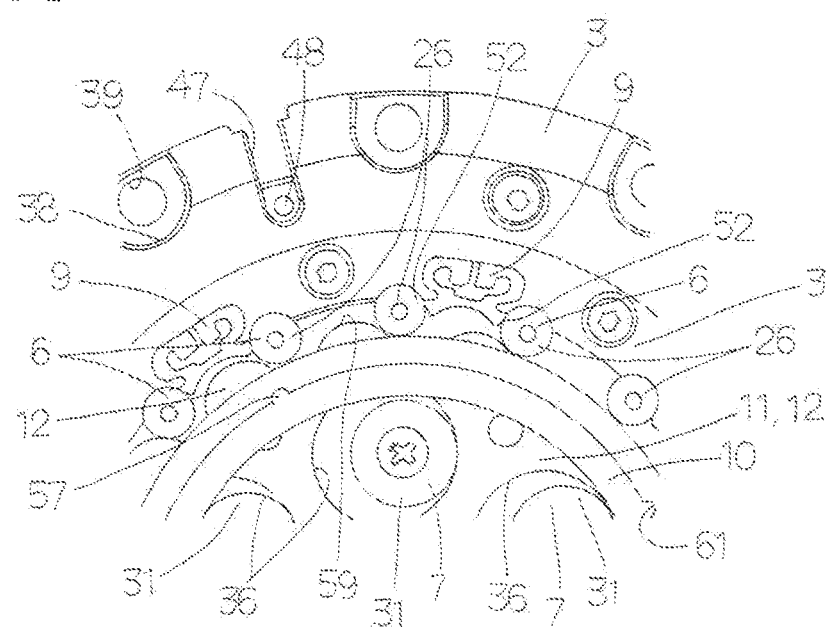
FIG. 8 is an enlarged front view of the reduction gear in a region VIII of FIG. 7.

As shown in FIG. 5, the reduction gear is mainly composed of the input shaft 1 which has a pair of eccentric portions 45 and 46 spaced from each other in the axial direction and having a phase difference of 180° therebetween; the two cycloid gears 11 and 12 which have center holes and rotate in contact with the outer circumferences of the eccentric portions 45 and 46; the hub 2 (output shaft) which is located adjacent to the cycloid gears 11 and 12 and rotatably supports the input shaft 1; an output shaft pin holder 5 which is fixed to the hub 2 such that the output shaft pin holder 5 is spaced from the hub 2 and the cycloid gears 11 and 12 intervene therebetween and which rotatably supports the input shaft 1; a plurality of outer pins 6 (outer gear pins) which roll on teeth portions 59 of the cycloid gears 11 and 12; an outer pin holder 3 which holds the outer pins 6 such that they are spaced from one another in the circumferential direction and which rotatably supports the hub 2 and the output shaft pin holder 5; and a plurality of inner pins (inner output pins) 7 which roll on the wall surfaces of a plurality of insertion holes 36 formed in the cycloid gears 11 and 12 and are rotatably supported by the hub 2. The cycloid gears 11 and 12 have center holes which receive the eccentric portions 45 and 46. In order to form a space for accommodating the cycloid gears 11 and 12 and the outer pins 6, an outer pin holder plate 4 is fixed to the outer pin holder 3 such that the outer pin holder plate 4 faces the outer pin holder 3 with a predetermined spacing therebetween. The outer pin holder plate 4 is fixed to the outer pin holder 3 by fixing bolts 50. As shown in FIG. 5, the two eccentric portions 45 and 46 are provided on the input shaft 1 to be located adjacent to each other in the axial direction. The eccentric portion 45 is located on the side where the output shaft pin holder 5 is provided, and the eccentric portion 46 is located on the side where the hub 2 is provided. Also, a lubricant passage 40 is formed in the input shaft 1 to be located adjacent to the eccentric portions 45 and 46.

Figure 1:
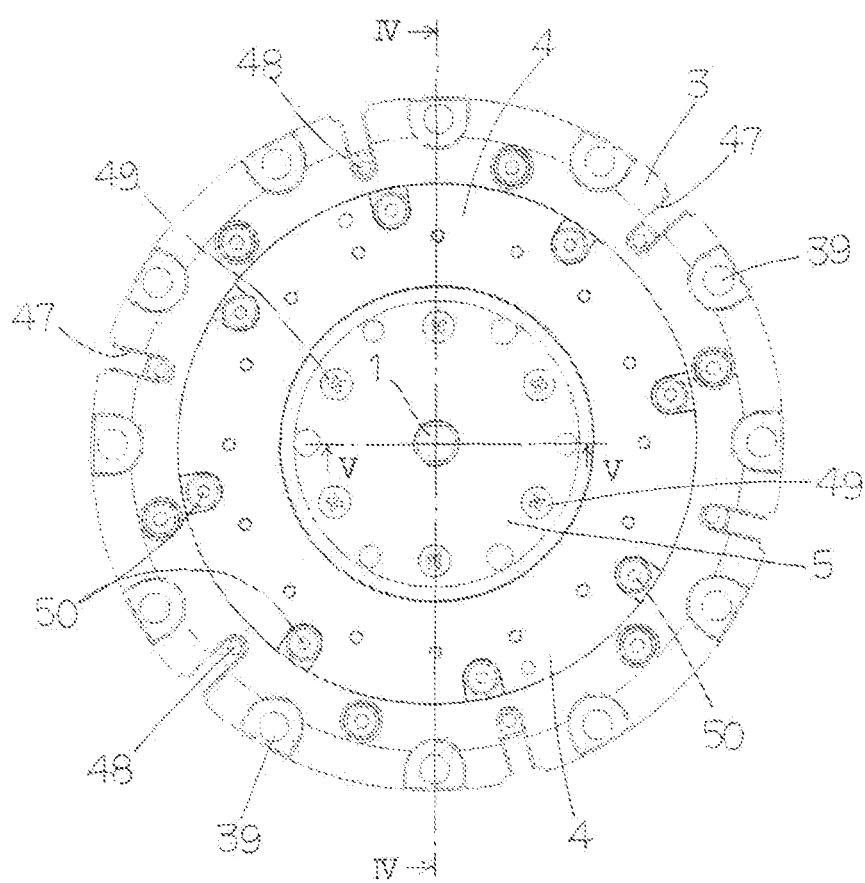
FIG. 1 is an external front view showing one embodiment of the reduction gear according to the present invention.
Figure 2:
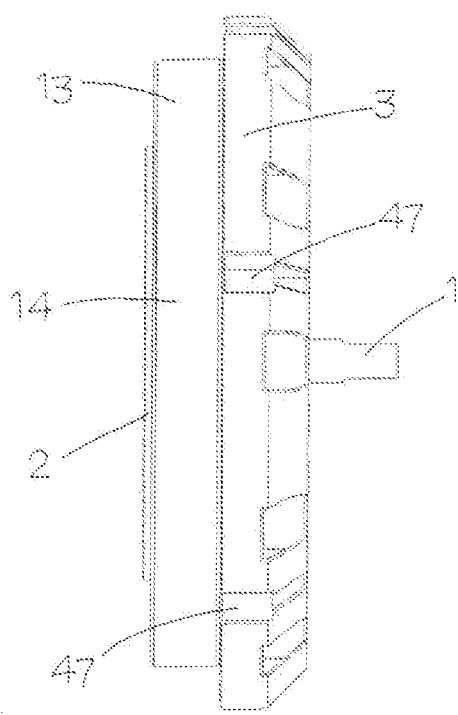
FIG. 2 is a side view of the reduction gear of FIG. 1.
Figure 3:
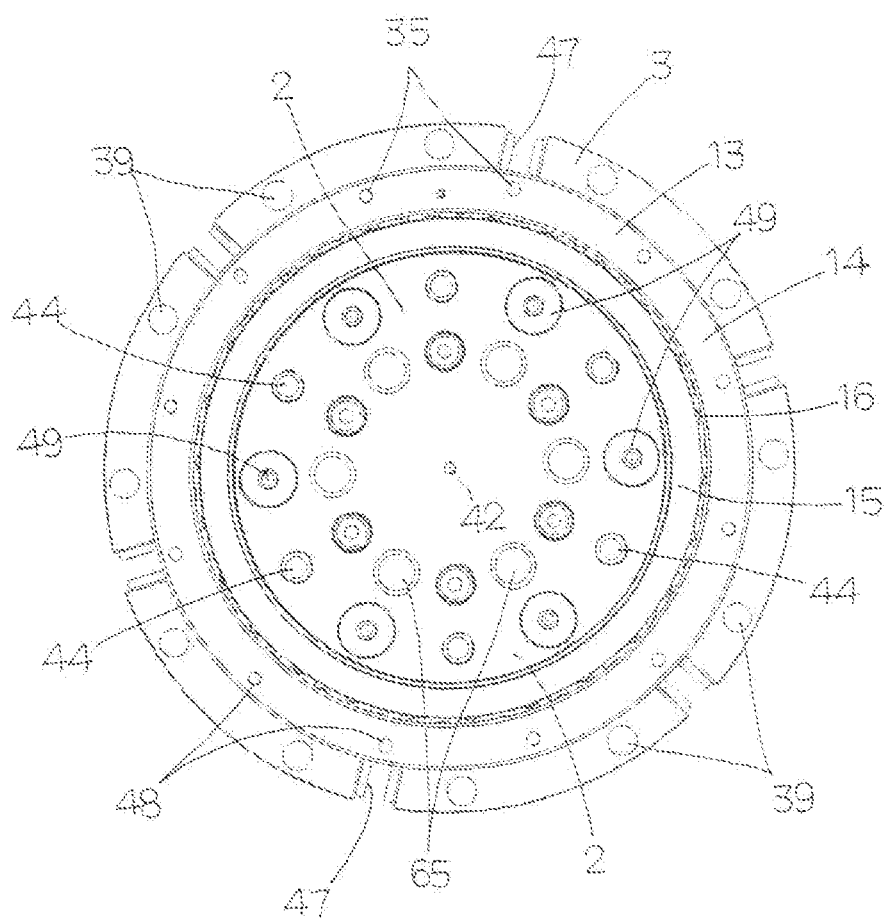
FIG. 3 is a back view of the reduction gear of FIG. 1.
Figure 4:
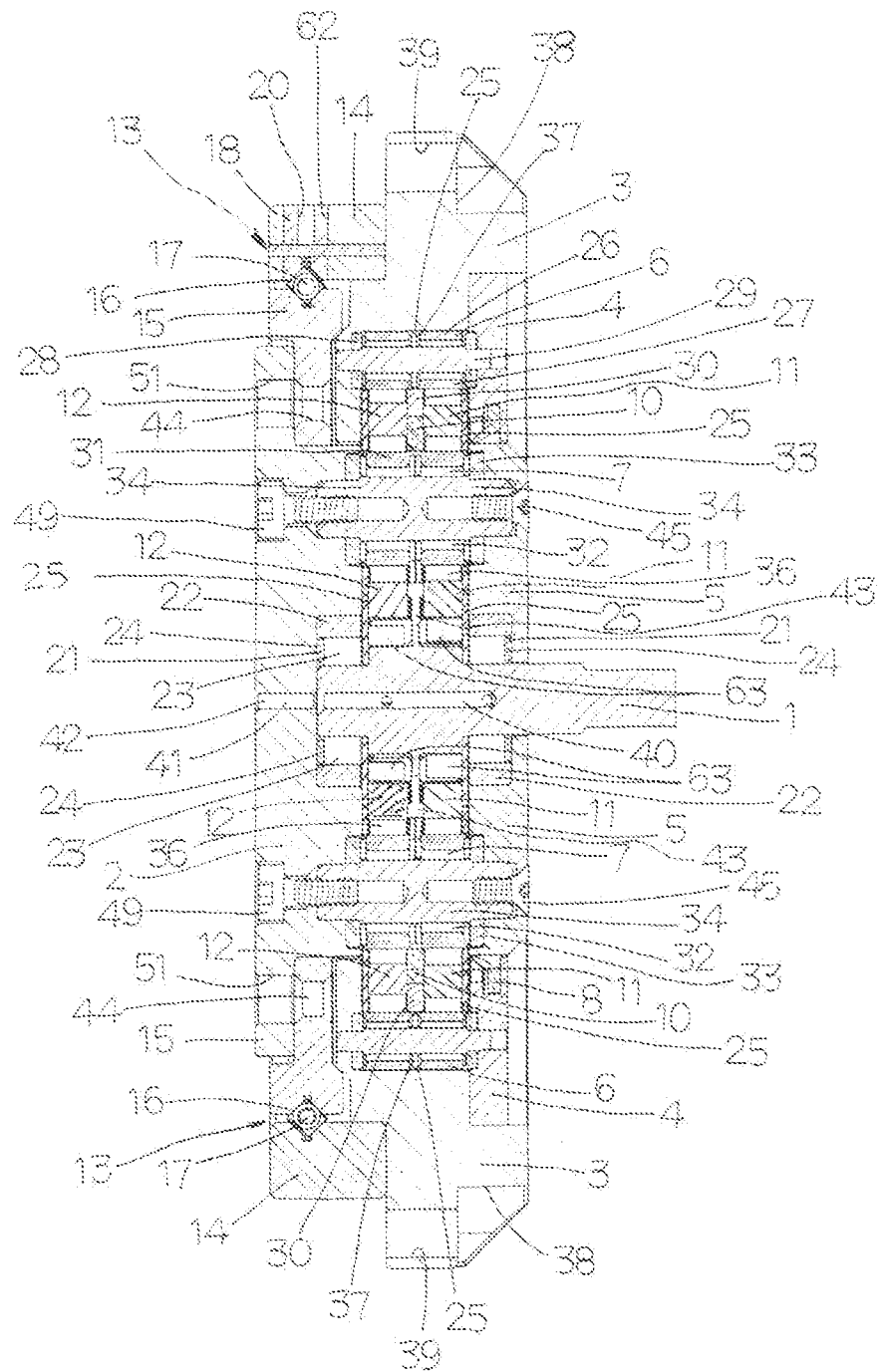
FIG. 4 is an enlarged sectional view of the reduction gear taken along line IV-IV in FIG. 1.

As shown in FIGS. 4 and 5, the input shaft 1 of the reduction gear is rotatably supported by the hub 2 and the output shaft pin holder 5 via bearings 21. Portions of the input shaft 1 at which the hub 2 and the output shaft pin holder 5 are located have a smaller diameter, and a portion of the input shaft 1 at which the two cycloid gears 11 and 12 are located has a larger diameter. The bearings 21 are composed of a plurality of rollers 23 which roll on the outer circumferential surface of the input shaft 1, a pair of outer rings 22 fitted into recesses formed in center portions of the hub 2 and the output shaft pin holder 5, and retainers 24 which retain the rollers 23. The two cycloid gears 11 and 12 are configured to rotate in contact with the outer circumferences of the eccentric portions 45 and 46 of the input shaft 1 via rollers 63 which constitute eccentric portion bearings. In this reduction gear, eccentric portion bearing guide plates 43 are disposed between the rollers 63 of the eccentric portion bearings and the bearings 21 which rotatably support the input shaft 1. The eccentric portion bearing guide plates 43 are formed of PEEK (polyether ether ketone) which is a thermoplastic resin for reducing frictional resistance.

The hub 2 is supported by the outer pin holder 3 through a cross roller bearing 13. The cross roller bearing 13 is composed of an outer ring 14 fixed to the outer pin holder 3, an inner ring 15 fixed to the hub 2 by screws, a plurality of rollers 16 disposed between the outer ring 14 and the inner ring 15, and a plurality of separators 17 disposed between the rollers 16. In the reduction gear, the hub 2 has a plurality of mounting holes 51, and the inner ring 15 has a plurality of threaded mounting holes 44. Screws (not shown) are passed through the mounting holes 51 of the hub 2 and are screwed into the threaded mounting holes 44 of the inner ring 15, whereby the inner ring 15 is fixed to the hub 2. Also, the outer pin holder 3 has a plurality of threaded mounting holes 48, and the outer ring 14 has a plurality of mounting holes 35 which are spaced from each other in the circumferential direction and through which screws for fixing the outer ring 14 to the outer pin holder 3 are passed. In the reduction gear, screws (not shown) are passed through the mounting holes 35 of the outer ring 14 and are screwed into the threaded mounting holes 48 of the outer pin holder 3, whereby the outer ring 14 is fixed to the outer pin holder 3. The outer ring 14 has a built-in hole 62 for building the rollers 16 and the separators 17 into a space between the outer ring 14 and the inner ring 15, and a cap 18 is fitted into the built-in hole 62. The cap 18 is fixed to the outer ring 14 by a pin 19 and has a lubricant supply hole 20 for supplying a lubricant.

Each of the outer pins 6 and the inner pin 7 is a rolling bearing composed of a plurality of rollers 27 or 32, whereby loss due to friction resistance is reduced. In the present embodiment, the number of the outer pin 6 is 16, and the number of the inner pins 7 is 6. In the present embodiment, each of the cycloid gears 11 and 12 has 15 teeth provided at equal intervals over the entire circumference. A solid lubricant may be provided inside the rolling bearings which constitute the outer pins 6 and the inner pins 7. The solid lubricant may be disposed by injecting a solution which contains lubrication oil and powder of ultrahigh molecular weight polyethylene into the rolling bearings, followed by sintering.

In this reduction gear, each outer pin 6 is composed of a shaft 29, a pair of outer rings 26 rotatably disposed on the shaft 29, and rollers 27 rolling between the outer rings 26 and the shaft 29. Opposite ends of the shaft 29 of each outer pin 6 are fitted into and fixed to fitting holes formed in the outer pin holder 3 and the outer pin holder plate 4. Namely, the outer pins 6 are stationary pins. Side plates 28 formed of metal are disposed at the axially opposite ends of each outer pin 6. The single shaft 29 of each outer pin 6 rotatably supports the pair of outer rings 26 which roll on the teeth portions 59 of the cycloid gears 11 and 12, respectively. The outer rings 26 of the outer pins 6 fixed to the outer pin holder 3 rotate in contact with the peripheral tooth surfaces of the tooth portions 59 as a result of rotation of the cycloid gears 11 and 12, and guide the cycloid gears 11 and 12.

Each inner pin 7 is composed of a shaft 34, a pair of outer rings 31 rotatably disposed on the shaft 34, and rollers 32 rolling between the outer rings 31 and the shaft 34. Opposite ends of the shaft 34 of each inner pin 7 are fixed to the hub 2 and the output shaft pin holder 5 by fixing bolts 49. In this reduction gear, the outer rings 26 and 31 and the rollers 27 and 32 are disposed in the cycloid gears 11 and 12 in such a manner that the rings and rollers in the cycloid gear 11 face the rings and rollers in the cycloid gear 12. Side plates 33 formed of metal are disposed at the axially opposite ends of each inner pin 7. The single shaft 34 of each inner pin 7 fixed to the hub 2 rotatably supports the pair of outer rings 31 which roll on the wall surfaces of the insertion holes 36 formed in the cycloid gears 11 and 12. The outer rings 31 of the inner pins 7 rotate in contact with the wall surfaces of the insertion holes 36 formed in the cycloid gears 11 and 12. The difference between the outer diameter of the outer rings 31 and the hole diameter of the insertion holes 36 corresponds to the eccentricity of the eccentric portions 45 and 46. In this reduction gear, as a result of rotation of the cycloid gears 11 and 12 in an eccentric state, the inner pins 7 rotate so as to rotate the hub 2.

This reduction gear includes a gear separator ring 30 which is disposed between the two cycloid gears 11 and 12 so as to allow the cycloid gears 11 and 12 to rotate independently of each other without dragging. The gear separator ring 30 is formed of POM (polyoxymethylene polyacetal) which is an acetal resin. Thrust washers 25 formed of PEEK (polyether ether ketone) which is a thermoplastic resin for reducing frictional resistance are built in at a plurality of locations on the opposite sides of the cycloid gears 11 and 12 where the cycloid gears 11 and 12 are in sliding contact with each other or in sliding contact with other members. Specifically, the thrust washers 25 are disposed between the two cycloid gears 11 and 12, between the cycloid gear 12 and the outer pin holder 3, between the cycloid gear 11 and the outer pin holder plate 4, between the cycloid gear 12 and the hub 2, and between the cycloid gear 11 and the output shaft pin holder 5. The paired outer pins 6 are arranged in the axial direction, a metal collar 37 is disposed between their outer rings 26, and the thrust washers 25 are disposed on the opposite sides of the collar 37.

In this reduction gear, the shafts 29 of the outer pins 6 are attached between the outer pin holder 3 and the outer pin holder plate 4 disposed around the output shaft pin holder 5 to face the outer pin holder 3. As a result, the outer pin holder 3 and the outer pin holder plate 4 are fixed to each other such that a predetermined spacing is provided therebetween. The shafts 34 of the inner pins 7 are attached between the hub 2 and the output shaft pin holder 5 disposed to face the hub 2. As a result, the hub 2 and the output shaft pin holder 5 are fixed to each other such that a predetermined spacing is provided therebetween. In this reduction gear, in order to allow smooth rotation of the output shaft pin holder 5, a rubber seal 8 for sealing the space in which the cycloid gears 11 and 12 are accommodated is disposed between the inner circumferential surface of the outer pin holder plate 4 and the outer circumferential surface of the output shaft pin holder 5. Namely, in this reduction gear, the seal 8 is attached to the outer pin holder plate 4, which does not rotate, so as to prevent the lubricant supplied to the two cycloid gears 11 and 12 from leaking to the motor side of the input shaft 1. A lip portion of the seal 8 is in contact with a shoulder portion of the rotating output shaft pin holder 5.

Figure 9:
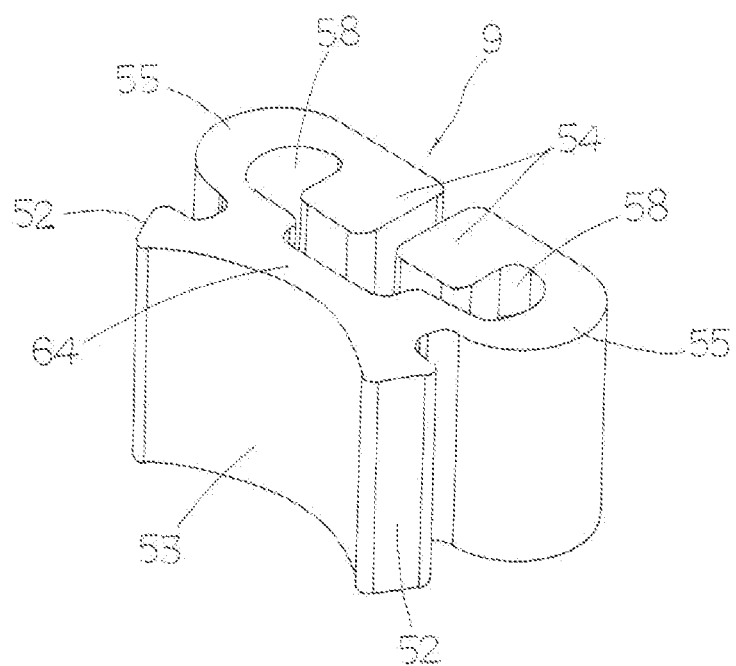
FIG. 9 is a perspective view of the block-shaped lubricating member built in the reduction gear according to the present invention.

This reduction gear is characterized by two types of lubricating members 9 and 10 which are in contact with the outer pins 6 and the inner pins 7 and lubricate them. The lubricating members 9 for lubricating the outer pins 6 are a plurality of (8 in the present embodiment) block-shaped lubricating members fitted into elliptical recesses 60 which are formed on the inner circumferential surface of the outer pin holder 3 supporting the outer pins 6 at predetermined intervals (45 degrees in the present embodiment) in the circumferential direction such that the lubricating members can elastically deform. The block-shaped lubricating members 9 lubricate the outer rings 26 of the outer pins 6. Specifically, the block-shaped lubricating members 9 are formed of a porous molded member impregnated with a lubricant. As shown in FIG. 9, each lubricating member 9 includes an arc portion 64 having a concave inner circumferential surface 53; a pair of arm portions 55 rising from opposite ends of the arc portion 64 in the circumferential direction; lubricant reserving portions 54 which are formed at spaced outer end portions of the arm portions 55 to face each other; and spaces 58 surrounded by the arc portion 64, the arm portions 55, and the lubricant reserving portions 54. Since each of the block-shaped lubricating members 9 includes the spaces 58 surrounded by the pair of arm portions 55 and the pair of lubricant reserving portions 54 spaced from each other, the lubricating members 9 are fitted into and supported by the recesses 60 of the outer pin holder 3 such that the lubricating members 9 can elastically deform. Each of the block-shaped lubricating members 9 has lubricant supply portions formed by the concave inner circumferential surface 53 and end surfaces 52 located on the opposite sides thereof in the circumferential direction. The lubricant supply portions formed by the inner circumferential surfaces 53 of the block-shaped lubricating members 9 are in contact with the peripheral tooth surfaces of the tooth portions 59 of the cycloid gears 11 and 12 and supply the lubricant to the peripheral tooth surfaces. The lubricant supply portions formed by the opposite end surfaces 52 of each block-shaped lubricating member 9 are in contact with the outer rings 26 of the two outer pins 6 located adjacent to the block-shaped lubricating member 9 and supply the lubricant to the outer rings 26 for lubrication.

Figure 10:
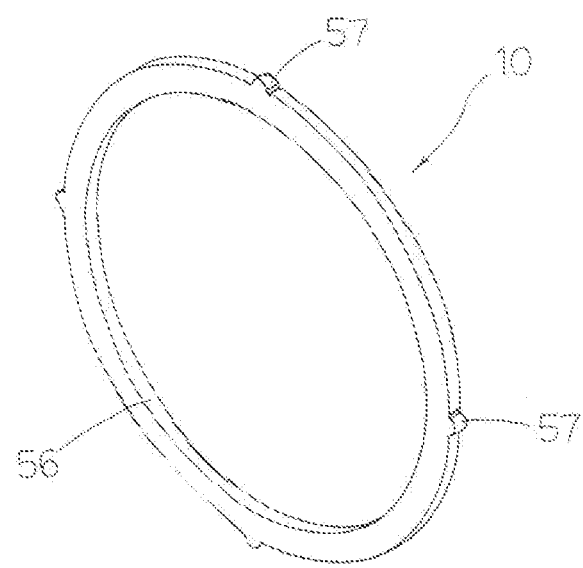
FIG. 10 is a perspective view of the ring-shaped lubricating member built in the reduction gear according to the present invention.

The lubricating member 10 for lubricating the inner pins 7 is a ring-shaped lubricating member which is supported by the gear separator ring 30 disposed between the cycloid gears 11 and 12 and lubricates the inner pins 7. The ring-shaped lubricating member 10 lubricates the outer rings 31 of the inner pins 7. Specifically, the ring-shaped lubricating member 10 is formed of a porous molded member impregnated with a lubricant. As shown in FIG. 10, the ring-shaped lubricating member 10 has an inner circumferential surface 56 which functions as a lubricant supply portion which is in contact with the outer rings 31 of the inner pins 7 and lubricates the outer rings 31. The inner circumferential surface 56 (the lubricant supply portion) of the ring-shaped lubricating member 10 extends over the entire inner circumference. The ring-shaped lubricating member 10 is in contact with the outer circumferential surfaces of the outer rings 31 of the inner pins 7 and supplies the lubricant to the outer circumferential surfaces. The ring-shaped lubricating member 10 is disposed between the cycloid gears 11 and 12 to be located on the radially inner side of the gear separator ring 30. In the present embodiment, the ring-shaped lubricating member 10 has four protrusions 57 provided on the outer circumferential surface thereof at constant intervals in the circumferential direction, and four recesses 61 formed on the inner circumferential surface of the gear separator ring 30 at constant intervals in the circumferential direction. The protrusions 57 of the ring-shaped lubricating member 10 are engaged with recesses 61 of the gear separator ring 30, whereby the ring-shaped lubricating member 10 and the gear separator ring 30 are positioned relative to each other in the circumferential direction. The ring-shaped lubricating member 10 functions as follows. The lubricant contained in the ring-shaped lubricating member 10 supplies oil to the end surfaces of the cycloid gears 11 and 12 to thereby reduce the frictional resistance produced as a result of the sliding contact between the gear separator ring 30 and the cycloid gears 11 and 12. Also, the lubricant supplied to the end surfaces of the cycloid gears 11 and 12 moves from the gear surfaces to the outer circumferential surfaces of the outer rings 31 of the inner pins 7 to thereby lubricate the inner pins 7.

In this reduction gear, the outer pin holder 3 has a plurality of (6 in the present embodiment) T-slot-shaped cutouts 47 spaced from one another in the circumferential direction. Although not illustrated, head portions of bolts for fixing a motor attached to the present reduction gear are disposed in the cutouts 47. The head portions of the motor attachment bolts are disposed in the cutouts 47 so as to attach the present reduction gear to the motor. The outer pin holder 3 has a plurality of (12 in the present embodiment) attachment holes 39 with counterbores 38 which are spaced from one another in the circumferential direction. Bolts (not shown) for attaching the outer pin holder 3 to a counterpart frame are inserted into the attachment holes 39. The output shaft of a motor for driving the input shaft 1 is connected to the input shaft 1. The hub 2 has threaded mounting holes 65 for attaching wheels such as tires. In this reduction gear, the hub 2, which serves as an output shaft, has a lubricant supply hole 42, and the outer ring 14 of the cross roller bearing 13 has a lubricant supply hole 20. The lubricant supply hole 20 of the outer ring 14 of the cross roller bearing 13 is provided in the cap 18 which closes a hole through which the rollers 16 and separators 17 of the cross roller bearing 13 are put into the internal space of the cross roller bearing 13. The hub 2 has, at its central portion, a lubricant supply hole 42 and a lubricant passage 41 communicating with the lubricant supply hole 42. The lubricant passage 41 communicates with the lubricant passage 40 formed in the input shaft 1. The lubricant passage 40 of the input shaft 1 extends to the rollers 63 of the eccentric portion bearings of the cycloid gears 11 and 12 and lubricates the rollers 63 of the eccentric portion bearings. In this reduction gear, the supplied lubricant is grease.

The present reduction gear is configured as described above and has a power transmission path as described below.

The present reduction gear operates as follows. When a switch of a mechanical apparatus such as an apparatus for travelling is turned on, the motor rotates. The rotation of the motor is transmitted to the input shaft 1. The input shaft 1 has the two eccentric portions 45 and 46 having a phase difference of 180° therebetween, and the cycloid gears 11 and 12 are disposed on the eccentric portions 45 and 46 such that the cycloid gears 11 and 12 rotate in contact with the outer circumferences of the eccentric portions 45 and 46 via the rollers 63 of the eccentric portion bearings. As a result of rotation of the input shaft 1, the cycloid gears 11 and 12 rotate eccentrically through the eccentric portions 45 and 46. The cycloid gears 11 and 12 have the insertion holes 36 and the tooth portions 59 formed along the outer circumferences thereof. Since the shafts 29 of the outer pins 6 are fixed to the outer pin holder 3, the outer pins 6 constitute a type of an internal gear on the outer pin holder 3. The cycloid gears 11 and 12 rotate in a state in which the tooth portions 59 formed along the outer circumferences of the cycloid gears 11 and 12 are in contact with the outer rings 26 of the outer pins 6 of the internal gear. The inner pins 7 whose shafts 34 are fixed to the hub 2 are inserted into the insertion holes 36. Therefore, the outer rings 31 of the inner pins 7 whose shafts 34 are fixed to the hub 2 rotate while rolling on the wall surfaces of the insertion holes 36 of the cycloid gears 11 and 12. Namely, the cycloid gears 11 and 12, which function as planetary gears, revolve at high speed and simultaneously rotate at low speed through the eccentric portion bearings of the eccentric portions 45 and 46 of the input shaft 1. When the cycloid gears 11 and 12, which function as planetary gears, rotate about their axis, the inner pins 7 rotate with the rotation of the cycloid gears 11 and 12, and the hub 2, which serves as an output shaft, rotates through the rotating inner pins 7.

In the present embodiment, since the number of the teeth of each of the cycloid gears 11 and 12 is 15 and the number of the outer pins 6 which constitute an internal gear which is a ring gear is 16, the speed reduction is represented by the following expression.

$$(15-16)/15=-1/15$$

Therefore, the hub 2 rotates in the direction opposite the rotational direction of the input shaft 1 at a speed which is one fifteenth of the rotational speed of the input shaft 1.

What is claimed is:

1. A reduction gear comprising:
   an input shaft having a pair of eccentric portions which are located adjacent each other in an axial direction of the input shaft and which have a phase difference of 180° therebetween in a circumferential direction of the input shaft;
   a pair of cycloid gears which rotate in contact with outer circumferences of the corresponding eccentric portions;
   a hub which is located adjacent to the cycloid gears, rotatably supports the input shaft, and serves as an output shaft;
   an output shaft pin holder which is fixed to the hub, with the cycloid gears intervening between the output shaft pin holder and the hub, and which rotatably supports the input shaft;
   a plurality of outer pins which roll on peripheral tooth surfaces of tooth portions of the cycloid gears;
   an outer pin holder which holds the outer pins such that the outer pins are spaced from one another in the circumferential direction and which rotatably supports the hub and the output shaft pin holder;
   a plurality of inner pins which roll on wall surfaces of a plurality of insertion holes formed in the cycloid gears and which are supported by the hub; and
   a plurality of lubricating members which are in contact with the outer pins and the inner pins and lubricate the outer pins and the inner pins.

2. The reduction gear according to claim 1, wherein the hub is rotatably supported by the outer pin holder through a cross roller bearing.

3. The reduction gear according to claim 1, wherein a gear separator ring is disposed between the cycloid gears, and thrust washers are built in to be located on opposite sides of the cycloid gears where the cycloid gears are in sliding contact with other members.

4. The reduction gear according to claim 1, wherein each of the outer pins and the inner pins is a rolling bearing which is composed of a shaft, a pair of outer rings rotatably disposed on the shaft, and a plurality of rollers rolling between the outer rings and the shaft; and
   side plates are disposed at axially opposite ends of the outer pins and the inner pins.

5. The reduction gear according to claim 4, wherein the shafts of the outer pins are attached between the outer pin holder and an outer pin holder plate which is disposed around the output shaft pin holder and faces the outer pin holder, with the cycloid gears intervening between the outer pin holder plate and the outer pin holder.

6. The reduction gear according to claim 4, wherein the shafts of the input pins are attached between the hub and the output shaft pin holder which is disposed to face the hub with the cycloid gears intervening between the output shaft pin holder and the hub.

7. The reduction gear according to claim 1, wherein the lubricating members include a block-shaped lubricating member which is elastically deformably fitted into and supported by a recess formed in the outer pin holder supporting the outer pins and which is in contact with the outer rings of the outer pins and lubricates the outer rings of the outer pins.

8. The reduction gear according to claim 7, wherein the block-shaped lubricating member includes a lubricant supply portion composed of an inner circumferential surface of the lubricating member and opposite end surfaces of the lubricating member which are formed at opposite ends of the inner circumferential surface in the circumferential direction, the inner circumferential surface being in contact with the peripheral tooth surfaces of the tooth portions of the cycloid gears so as to lubricate the peripheral tooth surfaces, and the opposite end surfaces being in contact with the outer rings of the outer pins located adjacent to the block-shaped lubricating member so as to lubricate the outer rings of the outer pins.

9. The reduction gear according to claim 1, wherein the lubricating members include a ring-shaped lubricating member which is fitted to and supported by an inner circumferential surface of a gear separator ring disposed between the cycloid gears and which lubricates the inner pins.

10. The reduction gear according to claim 9, wherein the ring-shaped lubricating member has a lubricant supply portion which is formed over the entirety of an inner circumferential surface of the ring-shaped lubricating member and is in contact with the outer rings of the inner pins so as to lubricate the outer rings of the inner pins.

11. The reduction gear according to claim 1, wherein each of the lubricating members is a porous molded member impregnated with a lubricant.

12. The reduction gear according to claim 1, wherein the outer pin holder has a plurality of T-slot-shaped cutouts spaced from one another in the circumferential direction, and head portions of bolts for fixing a motor attached to the reduction gear are disposed in the cutouts.

13. The reduction gear according to claim 1, wherein an output shaft of a motor driving the input shaft is connected to the input shaft, and a wheel including a tire is attached to the hub.

* * * * *